US011958935B2

United States Patent
Cai et al.

(10) Patent No.: US 11,958,935 B2
(45) Date of Patent: Apr. 16, 2024

(54) POLYURETHANE INSULATION FOAM COMPOSITION COMPRISING A STABILIZING COMPOUND

(71) Applicant: Huntsman International LLC, The Woodlands, TX (US)

(72) Inventors: Yangjun Cai, The Woodlands, TX (US); Lifeng Wu, The Woodlands, TX (US); Sachchida Singh, The Woodlands, TX (US); Yun-Shan Liu, The Woodlands, TX (US)

(73) Assignee: HUNTSMAN INTERNATIONAL LLC

( * ) Notice: Subject to any disclaimer, the term of this patent is extended or adjusted under 35 U.S.C. 154(b) by 0 days.

(21) Appl. No.: 17/273,526

(22) PCT Filed: Aug. 21, 2019

(86) PCT No.: PCT/US2019/047391
§ 371 (c)(1),
(2) Date: Mar. 4, 2021

(87) PCT Pub. No.: WO2020/055559
PCT Pub. Date: Mar. 19, 2020

(65) Prior Publication Data
US 2021/0340308 A1    Nov. 4, 2021

Related U.S. Application Data

(60) Provisional application No. 62/730,725, filed on Sep. 13, 2018.

(51) Int. Cl.
| C08G 18/50 | (2006.01) |
| C08G 18/18 | (2006.01) |
| C08G 18/32 | (2006.01) |
| C08G 18/48 | (2006.01) |
| C08G 18/66 | (2006.01) |
| C08G 18/76 | (2006.01) |
| C08J 9/12 | (2006.01) |

(52) U.S. Cl.
CPC ..... *C08G 18/5057* (2013.01); *C08G 18/1833* (2013.01); *C08G 18/3206* (2013.01); *C08G 18/482* (2013.01); *C08G 18/4829* (2013.01); *C08G 18/6611* (2013.01); *C08G 18/7664* (2013.01); *C08J 9/125* (2013.01); *C08G 2110/0025* (2021.01); *C08G 2110/005* (2021.01); *C08J 2375/08* (2013.01)

(58) Field of Classification Search
CPC ............ C08G 18/18; C08G 18/1833; C08G 18/3206; C08G 18/34; C08G 18/4816; C08G 18/482; C08G 18/4829; C08G 18/5021; C08G 18/5057; C08G 18/6611; C08G 18/7664; C08G 2110/0025; C08G 2110/005; C08J 9/125; C08J 2375/08
See application file for complete search history.

(56) References Cited

U.S. PATENT DOCUMENTS

| 8,906,974 | B2 | 12/2014 | Glos et al. | |
| 2007/0112085 | A1 | 5/2007 | Tokumoto et al. | |
| 2013/0137787 | A1 | 5/2013 | Burdeniuc et al. | |
| 2014/0371338 | A1* | 12/2014 | Chen | C08J 9/146 521/137 |
| 2016/0311961 | A1 | 10/2016 | Klostermann et al. | |
| 2017/0002166 | A1 | 1/2017 | Williams et al. | |
| 2017/0152343 | A1 | 6/2017 | Günther et al. | |
| 2018/0022885 | A1* | 1/2018 | Younes | C08G 18/7671 427/243 |
| 2018/0066099 | A1 | 3/2018 | Krupa et al. | |

FOREIGN PATENT DOCUMENTS

| CN | 103772634 A | 5/2014 |
| JP | 201430654 A | 2/2014 |
| JP | 2011500893 T | 5/2014 |
| WO | 2014/193689 A1 | 12/2014 |
| WO | 2019/055401 A1 | 3/2019 |
| WO | 2019/055441 A1 | 3/2019 |

OTHER PUBLICATIONS

International Search Report received in corresponding PCT Application PCT/US2019/047391 completed Oct. 8, 2019 and dated Nov. 18, 2019.
Written Opinion received in corresponding PCT Application PCT/US2019/047391 dated Nov. 18, 2019.
Office Action dated Jun. 13, 2023 for Corresponding Brazil Application No. BR112021004685-2.
Office Action dated May 31, 2023 for Corresponding Japan Application No. 2021-513965.

* cited by examiner

*Primary Examiner* — John M Cooney
(74) *Attorney, Agent, or Firm* — HUNTSMAN INTERNATIONAL LLC; Lewis Craft

(57) ABSTRACT

A polyurethane insulation foam composition is disclosed herein. The polyurethane insulation foam comprises: (i) an aromatic isocyanate compound; (ii) an isocyanate reactive compound; (iii) water; (iv) a tertiary amine compound; (v) a hydrophilic carboxylic acid compound; (vi) a halogenated olefin compound; (vii) a stabilizing compound, and (vii) optionally, other additives.

21 Claims, No Drawings

POLYURETHANE INSULATION FOAM COMPOSITION COMPRISING A STABILIZING COMPOUND

CROSS-REFERENCE TO RELATED APPLICATIONS

This application is the National Phase of International Application PCT/US2019/047391 filed Aug. 21, 2019 which designated the U.S. and which claims priority to U.S. Provisional App. Ser. No. 62/730,725 filed Sep. 13, 2018. The noted applications are incorporated herein by reference.

BACKGROUND

Field

The present disclosure relates generally to a polyurethane foam composition comprising halogenated olefins.

Background

Polyurethane insulation foams (e.g., rigid polyurethane insulation foams) are widely used in the refrigeration and construction industries as it offers good insulation performance at low densities. These foams have conventionally been prepared by reacting an isocyanate compound with an isocyanate reactive compound in presence of a suitable blowing agent. With regard to blowing agents, chlorofluorocarbons ("CFCs") and hydrochlorofluorocarbons ("HCFCs"), such as CFC-11 and HCFC-141b, have been widely used because they have been shown to produce closed-cell foams having acceptable thermal insulation and dimensional stability properties. However, in spite of these advantages, CFCs and HCFCs have fallen into disfavor as they may contribute to the depletion of ozone in the earth's atmosphere and to the greenhouse effect. Accordingly, the use of CFCs and HCFCs has been severely restricted.

More recently, saturated hydrofluorocarbons ("HFCs") and hydrocarbons ("HCs") have been used in polyurethane insulation foams since these compounds have a zero to near zero ozone depletion potential. Examples of HFC's and HC's include HFC-365mfc, HFC-245fa, cyclopentane, n-pentane, and iso-pentane. Like CFCs and HCFCs, these compounds have their own shortcomings. The global warming potential of HFCs has been considered relatively high and questions have been raised with regard to their viability as a long term solution. While the global warming potential of HCs has been considered low, these compounds can be highly flammable and some are deemed to be volatile organic compounds ("VOCs").

Accordingly, there remains a need to develop a polyurethane insulation foam composition using blowing agents having at least some of the following characteristics: (i) zero to near zero ozone depletion properties; (ii) zero to near zero global warming potential; (iii) not deemed to be VOCs; and (iv) not overly cost prohibitive to deploy in a safe manner. Additionally, the foams made from such compositions should also retain the superior insulation properties and low densities for which closed-cell rigid polyurethane foams are known.

DETAILED DESCRIPTION

As used herein, unless otherwise expressly specified, all numbers such as those expressing values, ranges, amounts or percentages may be read as if prefaced by the word "about", even if the term does not expressly appear. Plural encompasses singular and vice versa.

As used herein, "plurality" means two or more while the term "number" means one or an integer greater than one.

As used herein, "includes" and like terms means "including without limitation."

When referring to any numerical range of values, such ranges are understood to include each and every number and/or fraction between the stated range minimum and maximum. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, "molecular weight" means weight average molecular weight ($M_w$) as determined by Gel Permeation Chromatography.

Unless otherwise stated herein, reference to any compounds shall also include any isomers (e.g., stereoisomers) of such compounds.

Polyurethane Insulation Foam Composition

It is well understood that foam formation from a polyurethane foam composition typically involves multiple reactions. The choice of the compositions' components, such as catalyst and other ingredients, are dictated in part by the intended application (e.g., spray application, pour-in place application) or end use (e.g., insulation foam). In general, there may be three reactions that occur during the formation of a foam product from a polyurethane foam composition. The first reaction is often referred to as the gelling reaction. The gelling reaction involves the formation of a urethane compound as an isocyanate compound reacts with a polyol compound. The second reaction is referred to as the blowing reaction. The blowing reaction involves the formation of a urea compound and the release of carbon dioxide as an isocyanate compound reacts with water. The third reaction is referred to as the trimer reaction. The trimer reaction involves the formation of an isocyanurate compound as an isocyanate compound reacts with another isocyanate compound in the presence of a trimerization catalyst. Because the use of the trimerization catalyst is optional, the trimer reaction does not always occur in the formation of a polyurethane foam product. The aforementioned reactions take place at different rates and are dependent on a variety of variables such as temperature, catalyst level, catalyst type and other factors as well (e.g., the presence of either primary or secondary hydroxyl groups in the polyols used). However, to produce high-quality foam, the rates of the competing gelling, blowing, and trimer reactions must be properly balanced to meet the need of a given application/use while also ensuring that the internal cells of the polyurethane foam product do not collapse prior to or during the formation of the polyurethane foam product (e.g., during a polyurethane composition's foam rise phase). Additionally, the rates of the competing gelling, blowing, and trimer reactions must be properly balanced to ensure that the proper gel time, end of rise time, and cream time are being obtained from the polyurethane composition for a given application.

For example, in a spray foam application the formulator must tailor the polyurethane composition in a manner that would avoid any dripping or draining from the polyurethane composition after the composition has been sprayed onto a substrate (e.g., a wall or ceiling). This can be accomplished by using water and a strong blowing catalyst in the polyurethane composition to generate carbon dioxide ("$CO_2$"). Ideally, a fine froth (which is caused by the generation of $CO_2$) would form within couple of seconds of spraying the polyurethane composition onto the substrate thereby preventing any dripping or draining issues. Another factor a formulator must consider in connection with spray foam applications is a polyurethane composition's tack free time. For example, if a polyurethane composition has a short tack free time, then it could lead to frequent clogging of an applicator's spray equipment. Alternatively, if a polyurethane composition has a long tack free time, then it could lead to deformation of the foam when an applicator's body inadvertently touches the foam after it has been applied onto a substrate. Furthermore, if a polyurethane composition's gel time is too slow, then the foam that begins to form on a substrate (e.g., a wall) might begin to sag as the components of the composition react.

For a pour-in-place application (e.g., foams used in a refrigerator, water heater, or wall panel) the presence of water and a strong blowing catalyst in a polyurethane composition is required in order to resist void formation during the formation of the foam product. Voids can develop within the internal cell structure of a foam product as it forms due to air being introduced into the forming foam via liquid flow in the mold before the onset of gelling. Another factor a formulator must consider in connection with pour-in-place applications is a polyurethane composition's gel time. If a polyurethane composition has a short gel time, then this can lead to the mold not being fully filled with the polyurethane composition. Alternatively, if a polyurethane composition has a long gel time, then this can lead to long demold times for the final foam product.

While most tertiary amine catalysts used in a polyurethane composition will drive all three reactions described above to some extent, the catalyst used in a polyurethane composition and the amount that it is used in such composition is often selected based on which reaction or reactions the formulator would like to favor/facilitate. For instance, if the formulator wishes to favor the gelling reaction, then the formulator would select catalysts that favor the gelling reaction (e.g., N-ethylmorpholine) over other catalyst that do not favor such reaction (e.g., N,N,N',N",N"-pentamethyldiethylenetriamine). On the other hand, if the formulator wishes to favor the blowing reaction over the gelling reaction, then the formulator would select a catalyst that would favor the blowing reaction (e.g., N,N,N',N",N"-pentamethyldiethylenetriamine).

In addition to tertiary amine catalysts, a polyurethane composition can also comprise a halogenated olefin ("HFO") blowing agent. The use of some HFOs, however, can result in the loss of reactivity of certain reactive components in a composition comprising a tertiary amine catalyst due to an unintended adverse reaction between the HFO compound and the tertiary amine catalyst. As will be explained in greater detail below, the aforementioned loss of reactivity can then lead to other issues in the final foam due in part to the reaction products (e.g., halogenated ions and amine salts) of the HFO compound and tertiary amine catalyst used in the polyurethane composition The potential of the HFO compound and tertiary amine reacting with one another is not only problematic in a one component polyurethane system but it is equally problematic in cases where the polyurethane insulation foam composition is provided as a two component system. A typical two component polyurethane system is comprised of an "A-Side" and "B-Side." The A-Side, which is also known as the iso-side, comprises an isocyanate compound and, optionally, other compounds that do not react with the isocyanate compound. The B-Side, which is also known as the polyol-side, comprises an isocyanate reactive compound and, optionally, water, catalyst, blowing agents, foam-stabilizing surfactants, and other additive compounds. If the HFO and tertiary amine compounds are both placed in the B-Side, then there is a high probability that those two compounds will begin reacting prior to the B-Side being mixed with the A-Side thereby creating the halogenated ion and amine salt reaction products mentioned above.

The halogenated ions and amine salt reaction products can have a negative impact on the polyurethane composition in several ways. For instance, the amine salts can precipitate out of the B-Side making the B-Side turbid. Additionally, the halogenated ions can decompose silicone based surfactants that are widely used in various polyurethane compositions. The depletion/degradation of the silicone based surfactant typically leads to a foam product having lower insulative properties because the foam product will not only have a higher overall density but it will also have a larger and more open internal cell structure which adversely affects the foam's insulative properties.

The polyurethane insulation foam composition of the present disclosure solves the issues mentioned above by providing a polyurethane foam composition comprising blowing agents, which are not deemed to be VOCs, having zero to near zero ozone depletion properties and zero to near zero global warming potential. Moreover, the polyurethane insulation foam composition of the present disclosure also eliminates or reduces the unintended reaction between HFO compounds and tertiary amine catalysts present in the composition thereby extending not only the shelf-life of the composition but also allowing for the production of a foam product having consistent insulative properties and internal cell structures.

The polyurethane insulation foam composition disclosed herein comprises: (i) an isocyanate compound; (ii) an isocyanate reactive compound; (iii) water; (iv) a tertiary amine compound; (v) a hydrophilic carboxylic acid compound (vi) a halogenated olefin compound; (vii) a stabilizing compound wherein the stabilizing compound comprises an un-alkoxylated polyhydroxy compound having 4 or more hydroxyl groups and (viii) optionally, other additives. In certain embodiments, the polyurethane insulation foam composition disclosed herein has a CT REACTIVE SHIFT (defined in the Examples below) less than or equal to 60 (e.g., less than or equal to 50 or 40 or 3025 or 20 or 15 or 10 or 5 or 1 or 0) and a TFT REACTIVE SHIFT (defined below in the Examples) less than or equal to 60 (e.g., less than or equal to 50 or 40 or 30 or 20 or 15 or 10 or 5 or 1 or 0). In certain embodiments, the polyurethane insulation foam composition is a spray polyurethane insulation foam composition (e.g., a spray polyurethane insulation foam composition such as a closed cell spray polyurethane insulation foam composition). In other embodiments, the polyurethane insulation foam composition is a pour-in-place polyurethane insulation foam composition such as a closed cell pour-in-play polyurethane foam insulation composition.

Component (i): Isocyanate Compound

The polyurethane insulation foam composition disclosed herein comprises one or more isocyanate compounds. In some embodiments, the isocyanate compound is a polyisocyanate compound. Suitable polyisocyanate compounds that may be used include aliphatic, araliphatic, and/or aromatic polyisocyanates. The isocyanate compounds typically have the structure R—(NCO)$_x$ where x is at least 2 and R comprises an aromatic, aliphatic, or combined aromatic/aliphatic group. Non-limiting examples of suitable polyisocyanates include diphenylmethane diisocyanate ("MDI") type isocyanates (e.g., 2,4'-, 2,2'-, 4,4'-MDI or mixtures thereof), mixtures of MDI and oligomers thereof (e.g., polymeric MDI or "crude" MDI), and the reaction products of polyisocyanates with components containing isocyanate-reactive hydrogen atoms (e.g., polymeric polyisocyanates or prepolymers). Accordingly, suitable isocyanate compounds that may be used include SUPRASEC® DNR isocyanate, SUPRASEC® 2185 isocyanate, RUBINATE® M isocyanate, and RUBINATE® 1850 isocyanate, or combinations thereof. As used herein, SUPRASEC® and RUBINATE® isocyanates are all available from Huntsman International LLC.

Other examples of suitable isocyanate compounds also include tolylene diisocyanate ("TDI") (e.g., 2,4 TDI, 2,6 TDI, or combinations thereof), hexamethylene diisocyanate ("HMDI" or "HDI"), isophorone diisocyanate ("IPDI"), butylene diisocyanate, trimethylhexamethylene diisocyanate, di(isocyanatocyclohexyl)methane (e.g. 4,4'-diisocyanatodicyclohexylmethane), isocyanatomethyl-1,8-octane diisocyanate, tetramethylxylene diisocyanate ("TMXDI"), 1,5-naphtalenediisocyanate ("NDI"), p-phenylenediisocyanate ("PPDI"), 1,4-cyclohexanediisocyanate ("CDI"), tolidine diisocyanate ("TODI"), or combinations thereof. Modified polyisocyanates containing isocyanurate, carbodiimide or uretonimine groups may also be employed as Component (i).

Blocked polyisocyanates can also be used as Component (i) provided that the reaction product has a deblocking temperature below the temperature at which Component (i) will be reacted with Component (ii). Suitable blocked polyisocyanates can include the reaction product of: (a) a phenol or an oxime compound and a polyisocyanate, or (b) a polyisocyanate with an acid compound such as benzyl chloride, hydrochloric acid, thionyl chloride or combinations. In certain embodiments, the polyisocyanate may be blocked with the aforementioned compounds prior to introduction into the reactive ingredients/components used to in the composition disclosed herein.

Mixtures of isocyanates, for example, a mixture of TDI isomers (e.g., mixtures of 2,4- and 2,6-TDI isomers) or mixtures of di- and higher polyisocyanates produced by phosgenation of aniline/formaldehyde condensates may also be used as Component (i).

In some embodiments, the isocyanate compound is liquid at room temperature. A mixture of isocyanate compounds may be produced in accordance with any technique known in the art. The isomer content of the diphenyl-methane diisocyanate may be brought within the required ranges, if necessary, by techniques that are well known in the art. For example, one technique for changing isomer content is to add monomeric MDI (e.g., 2,4-MDI) to a mixture of MDI containing an amount of polymeric MDI (e.g., MDI comprising 30% to 80% w/w 4,4'-MDI and the remainder of the MDI comprising MDI oligomers and MDI homologues) that is higher than desired.

Component (i) can comprise 30% to 65% (e.g., 33% to 62% or 35% to 60%) by weight of the polyurethane insulation foam composition based the total weight of the composition.

Component (ii): Isocyanate Reactive Compound

Any of the known organic compounds containing at least two isocyanate reactive moieties per molecule may be employed as the isocyanate reactive compound. For example, polyol compounds or mixtures thereof that are liquid at 25° C., have a molecular weight ranging from 60 to 10,000 (e.g., 300 to 10,000 or less than 5,000), a nominal hydroxyl functionality of at least 2, and a hydroxyl equivalent weight of 30 to 2000 (e.g., 30 to 1,500 or 30 to 800) can be used as Component (ii).

Examples of suitable polyols that may be used as Component (ii) include polyether polyols, such as those made by addition of alkylene oxides to initiators, containing from 2 to 8 active hydrogen atoms per molecule. In some embodiments, the aforementioned initiators include glycols, glycerol, trimethylolpropane, triethanolamine, pentaerythritol, sorbitol, sucrose, ethylenediamine, ethanolamine, diethanolamine, aniline, toluenediamines (e.g., 2,4 and 2,6 toluenediamines), polymethylene polyphenylene polyamines, N-alkylphenylene-diamines, o-chloro-aniline, p-aminoaniline, diaminonaphthalene, or combinations thereof. Suitable alkylene oxides that may be used to form the polyether polyols include ethylene oxide, propylene oxide, and butylene oxide, or combinations thereof.

Other suitable polyol compounds that may be used as Component (ii) include Mannich polyols having a nominal hydroxyl functionality of at least 2, and having at least one secondary or tertiary amine nitrogen atom per molecule. In some embodiments, Mannich polyols are the condensates of an aromatic compound, an aldehyde, and an alkanol amine. For example, a Mannich condensate may be produced by the condensation of either or both of phenol and an alkylphenol with formaldehyde and one or more of monoethanolamine, diethanolamine, and diisopronolamine. In some embodiments, the Mannich condensates comprise the reaction products of phenol or nonylphenol with formaldehyde and diethanolamine. The Mannich condensates of the present invention may be made by any known process. In some embodiments, the Mannich condensates serve as initiators for alkoxylation. Any alkylene oxide (e.g., those alkylene oxides mentioned above) may be used for alkoxylating one or more Mannich condensates. When polymerization is completed, the Mannich polyol comprises primary hydroxyl groups and/or secondary hydroxyl groups bound to aliphatic carbon atoms.

In certain embodiments, the polyols that are used are polyether polyols that comprise propylene oxide ("PO"), ethylene oxide ("EO"), or a combination of PO and EO groups or moieties in the polymeric structure of the polyols. These PO and EO units may be arranged randomly or in block sections throughout the polymeric structure. In certain embodiments, the EO content of the polyol ranges from 0 to 100% by weight based on the total weight of the polyol (e.g., 50% to 100% by weight). In some embodiments, the PO content of the polyol ranges from 100 to 0% by weight based on the total weight of the polyol (e.g., 100% to 50% by weight). Accordingly, in some embodiments, the EO content of a polyol can range from 99% to 33% by weight of the polyol while the PO content ranges from 1% to 67% by weight of the polyol. Moreover, in some embodiments, the EO and/or PO units can either be located terminally on the polymeric structure of the polyol or within the interior sections of the polymeric backbone structure of the polyol. Suitable polyether polyols include poly(oxyethylene oxypropylene) diols and triols obtained by the sequential addition of propylene and ethylene oxides to di- or trifunctional initiators that are known in the art. In certain embodiments, Component (ii) comprises the aforementioned diols or triols or, alternatively, Component (ii) can comprise a mixture of these diols and triols.

The aforementioned polyether polyols also include the reaction products obtained by the polymerization of ethylene oxide with another cyclic oxide (e.g., propylene oxide) in the presence of polyfunctional initiators such as water and low molecular weight polyols. Suitable low molecular weight polyols include ethylene glycol, propylene glycol, diethylene glycol, dipropylene glycol, cyclohexane dimethanol, resorcinol, bisphenol A, glycerol, trimethylolopropane, 1,2,6-hexanetriol, pentaerythritol, or combinations thereof.

Polyester polyols that can be used as Component (ii) include polyesters having a linear polymeric structure and a number average molecular weight (Mn) ranging from about 500 to about 10,000 (e.g., preferably from about 700 to about 5,000 or 700 to about 4,000) and an acid number generally less than 1.3 (e.g., less than 0.8). The molecular weight is determined by assay of the terminal functional groups and is related to the number average molecular weight. The polyester polymers can be produced using techniques known in the art such as: (1) an esterification reaction of one or more glycols with one or more dicarboxylic acids or anhydrides; or (2) a transesterification reaction (i.e. the reaction of one or more glycols with esters of dicarboxylic acids). Mole ratios generally in excess of more than one mole of glycol to acid are preferred so as to obtain linear polymeric chains having terminal hydroxyl groups. Suitable polyester polyols also include various lactones that are typically made from caprolactone and a bifunctional initiator such as diethylene glycol. The dicarboxylic acids of the desired polyester can be aliphatic, cycloaliphatic, aromatic, or combinations thereof. Suitable dicarboxylic acids which can be used alone or in mixtures generally have a total of from 4 to 15 carbon atoms include succinic, glutaric, adipic, pimelic, suberic, azelaic, sebacic, dodecanedioic, isophthalic, terephthalic, cyclohexane dicarboxylic, or combinations thereof. Anhydrides of the aforementioned dicarboxylic acids (e.g., phthalic anhydride, tetrahydrophthalic anhydride, or combinations thereof) can also be used. In some embodiments, adipic acid is the preferred acid. The glycols used to form suitable polyester polyols can include aliphatic and aromatic glycols having a total of from 2 to 12 carbon atoms. Examples of such glycols include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, or combinations thereof.

Additional examples of suitable polyols include hydroxyl-terminated polythioethers, polyamides, polyesteramides, polycarbonates, polyacetals, polyolefins, polysiloxanes, and simple glycols such as ethylene glycol, butanediols, diethylene glycol, triethylene glycol, the propylene glycols, dipropylene glycol, tripropylene glycol, and mixtures thereof.

Additional examples of suitable polyols include those derived from a natural source, such as plant oil, fish oil, lard, and tallow oil. Plant based polyols may be made from any plant oil or oil blends containing sites of unsaturation, including, but not limited to, soybean oil, castor oil, palm oil, canola oil, linseed oil, rapeseed oil, sunflower oil, safflower oil, olive oil, peanut oil, sesame seed oil, cotton seed oil, walnut oil, and tung oil.

The active hydrogen-containing material may contain other isocyanate reactive material such as, without limitation, polyamines and polythiols. Suitable polyamines include primary and secondary amine-terminated polyethers, aromatic diamines such as diethyltoluene diamine and the like, aromatic polyamines, and combinations thereof.

Component (ii) can comprise 20% to 50% (e.g., 23% to 47% or 25% to 45%) by weight of the polyurethane insulation foam composition based the total weight of the composition.

Component (iii): Water

The polyurethane insulation foam composition disclosed herein comprises water. While water can be considered an isocyanate reactive compound, for purposes of this disclosure water shall be considered a distinct component from Component (ii). In other words, the polyurethane insulation foam composition disclosed herein comprises not only Component (ii) but water as well.

Any type of purified water can be used as Component (iii) provided that it has been filtered or processed to remove impurities. Suitable types of water include distilled water and water that has been purified via one or more of the following processes: capacitive deionization, reverse osmosis, carbon filtering, microfiltration, ultrafiltration, ultraviolet oxidation, and/or electrodeionization.

Component (iii) can comprise 0.25% to 2.5% (e.g., 0.4% to 9% or 3% to 8%) by weight of the polyurethane insulation foam composition based on the total weight of the composition.

Component (iv): Tertiary Amine Compound & Other Optional Catalysts

The polyurethane insulation foam composition disclosed herein comprises a one or more tertiary amine compounds. In some embodiments, the tertiary amine compound has the structure of Formula (I).

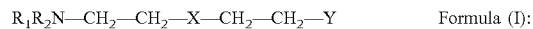

$$R_1R_2N\text{—}CH_2\text{—}CH_2\text{—}X\text{—}CH_2\text{—}CH_2\text{—}Y \qquad \text{Formula (I):}$$

wherein
$R_1$ and $R_2$ are independently $C_1$-$C_4$ alkyl or $C_2$-$C_4$ alkanol;
X is Oxygen or N—$R_3$ wherein $R_3$ is $C_1$-$C_4$ alkyl or $C_2$-$C_4$ alkanol or OH; and
Y is OH or $NR_4R_5$ wherein $R_4$ and $R_5$ are independently $C_1$-$C_4$ alkyl or $C_2$-$C_4$ alkanol.

Suitable amine catalyst compounds comprising at least one tertiary group include bis-(2-dimethylaminoethyl)ether (e.g., JEFFCAT® ZF-20 catalyst, DABCO BL-19 available from Evonik Industries AG, and Niax A-99), N,N,N'-trimethyl-N'-hydroxyethylbisaminoethylether (e.g., JEFFCAT® ZF-10 catalyst), N-(3-dimethylaminopropyl)-N,N-diisopropanolamine (e.g., JEFFCAT® DPA catalyst), N,N-dimethylethanolamine (e.g., JEFFCAT® DMEA catalyst), blends of N,N-dimethylethanolamine aniethylene diamine (e.g., JEFFCAT® TD-20 catalyst), N,N-dimethylcyclohexylamine (e.g., JEFFCAT® DMCHA catalyst; N-methyldicyclohexylamine (e.g., POLYCAT 12 available from Evonik Industries AG), benzyldimethylamine (e.g., JEFFCAT® BDMA catalyst), pentamethyldiethylenetriamine (e.g., JEFFCAT® PMDETA catalyst), N,N,N',N'',N''-pentamethyldipropylenetriamine (e.g., JEFFCAT® ZR-40 catalyst), N,N-bis(3-dimethylaminopropyl)-N-isopropanolamine (e.g, JEFFCAT® ZR-50 catalyst), N'-(3-(dimethylamino)propyl-N,N-dimethyl-1,3-propanediamine (e.g., JEFFCAT® Z-130 catalyst), 2-(2-dimethylaminoethoxy)ethanol (e.g., JEFFCAT® ZR-70 catalyst), N,N,N'-trimethylaminoethyl-ethanolamine (e.g., JEFFCAT® Z-110 catalyst, DABCO T available from Evonik Industries AG, and TOYOCAT-RX5 available from Tosho Corporation), 2-[N-(dimethylaminoethoxyethyl)-N-methylamino]ethanol (e.g., DABCO NE200 catalyst available from Evonik), N,N,N'-trimethyl-N'-3-aminopropyl-bis(aminoethyl) ether (e.g., DABCO NE300 catalyst available from Evonik), N,N,N',N',N"-pentamethyldiethylenetriamine (e.g., Kaolizer #3), N,N,N',N'-tetramethylenediamine (e.g., TOYOCAT-TE available from Tosho Corporation), N-ethylmorpholine (e.g, JEFFCAT® NEM catalyst), N-methylmorpholine (e.g., JEFFCAT® NMM catalyst), 4-methoxyethylmorpholine, N,N'dimethylpiperzine (e.g, JEFFCAT® DMP catalyst), 2,2'dimorpholinodiethylether (e.g., JEFFCAT® DMDEE catalyst), 1,3,5-tris(3-(dimethylamino)propyl)-hexahydro-s-triazine (e.g., JEFFCAT® TR-90 catalyst), 1-Propanamine, 3-(2-(dimethylamino)ethoxy), substituted imidazoles (e.g., 1-methylimidazole, 1,2-dimethlyimidazol (e.g., DABCO 2040 available from Evonik Industries AG and TOYOCAT DM70 available from Tosho Corporation), 1-methyl-2-hydroxyethylimidazole (e.g., N-(3-aminopropyl)imidazole, 1-n-butyl-2-methylimidazole, 1-iso-butyl-2-methylimidazole, N,N'-dimethylpiperazines), bis-substituted piperazines (e.g., aminoethylpiperazine, N,N',N'-trimethyl aminoethylpiperazine or bis-(N-methyl piperazine)urea), N-methylpyrrolidines and substituted methylpyrrolidines (e.g., 2-aminoethyl-N-methylpyrrolidine or bis-(N-methylpyrrolidine)ethyl urea), 3-dimethylaminopropylamine, N,N,N",N"-tetramethyldipropylenetriamine, tetramethylguanidine, 1,2-bis-diisopropanol, or combinations thereof. Other examples of amine catalysts include N-alkylmorpholines, N-butylmorpholine and dimorpholinodiethylether, N,N'-dimethylaminoethanol, N,N-dimethylamino ethoxyethanol, bis-(dimethylaminopropyl)-amino-2-propanol, bis-(dimethylamino)-2-propanol, bis-(N,N-dimethylamino)ethylether; N,N,N'-trimethyl-N'hydroxyethyl-bis-(aminoethyl)ether; N,N-dimethyl amino ethyl-N'-methyl amino ethanol; tetramethyliminobispropylamine; N,N-dimethyl-p-toluidine; diethyltoluenediamine (Ethacure 100); 3,5-dimethylthio-2,4-toluenediamine (Ethacure 300); poly(oxypropylene)triamine (JEFFAMINE® T-5000) reactive acid blocked catalysts (e.g., phenolic acid salt of 1,8-diazabicyclo(5,4,0) undecene-7 (POLYCAT SA-1), JEFFCAT® LED and JEFFCAT® ZF brand catalysts), or combinations thereof.

Other amine catalysts which may be used polyurethane composition disclosed herein may be found in Appendix D in "Dow Polyurethanes Flexible Foams" by Herrington et al. at pages D.1-D.23 (1997), which is incorporated herein by reference. Further examples may be found in "JEFFCAT® Amine Catalysts for the Polyurethane Industry" version JCT-0910 which is incorporated herein by reference.

Non-amine catalyst compounds may be used in combination with the tertiary amine compounds that comprise Component (iv). Suitable non-amine catalyst compound that can be used include organo-metallic compounds (e.g., organic salts of transition metals such as titanium, iron, nickel), post-transition metals (e.g., zinc, tin and bismuth), alkali metals (e.g., lithium, sodium and potassium), alkaline earth metals (e.g., magnesium and calcium), or combinations thereof. Other suitable non-amine catalyst compounds include ferric chloride, ferric acetylacetonate, zinc salts of carboxylic acids, zinc 2-ethylhexanoate, stannous chloride, stannic chloride, tin salts of carboxylic acids, dialkyl tin salts of carboxylic acids, tin (II) 2-ethylhexanoate, dibutyltin dilaurate (e.g., DABCO T-12 available from Evonik Industries AG), dimethyltin dimercaptide (e.g., FOMREZ UL-22 available from Momentive Performance Materials Inc.), bismuth (Ill) carboxylate salts (e.g., bismuth(2-ethylhexanote)), bismuth neodecanoate (DABCO MB-20 available from Evonik Industries AG), bismuth pivalate, bismuth-based catalysts (e.g., the compounds identified in US Patent Pub. No. 016/020888), 1,1',1",1'"-(1,2-ethanediyldinitrilo) tetrakis[2-propanol] neodecanoate complexes (e.g., BICAT 8840 available from Shepherd Chemicals Co.), 2,2',2",2'"-(1,2-ethanediyldinitrilo)tetrakis[ethanol] neodecanoate complexes (e.g., BICAT 8842 available from Shepherd Chemicals Co.), K-KAT XC-C227 bismuth salt (available from King Industries), sodium acetate, sodium N-(2-hydroxy-5-nonylphenol)methyl-N-methylglycinate (JEFFCAT® TR52), bismuth(2-ethylhexanote), or combinations thereof.

Suitable trimerization catalysts that may be used in combination with the catalysts listed above (i.e., Component (iv) and/or the non-amine catalyst compounds) include potassium salts of carboxylic acids (e.g., potassium acetate, potassium pivlate, potassium octoate, potassium triethylacetate, potassium neoheptanoate, potassium neooctanoate), quaternary ammonium carboxylates (e.g., (2-hydroxypropyl)trimethylammonium 2-ethylhexanoate ("TMR"), (2-hydroxypropyl)trimethylammonium formate ("TMR-2"), tetramethylammonium pivalate, tetramethylammonium triethylacetate, TOYOCAT TRX (available from Tosoh, Corp)), or combinations thereof.

Component (iv) can comprise 0.5% to 4% (e.g., 0.7% to 3.7% or 0.5% to 3.5%) by weight of the polyurethane insulation foam composition based on the total weight of the composition. If used in combination with other amine or non-amine catalysts, then such catalysts (i.e., not the compounds used as Component (iv)) can comprise 0% to 4% (e.g., 0.2% to 3.7% or 0.5% to 3.5%) by weight of the polyurethane insulation foam composition based on the total weight of the composition.

While the amount of catalyst depends on the reactivity requirements of the application, including geographic and seasonal requirements, the weight ratio of: (1) the tertiary amine catalyst of Formula (I) to (2) the amine catalyst containing at least one amine group and/or the non-amine catalyst is at least 1:5 (e.g., at least 1:2, at least 1:1, at least 2:1, or at least 5:1).

Component (v): Hydrophilic Carboxylic Acid Compound

The polyurethane insulation foam composition disclosed herein comprises a one or more hydrophilic carboxylic acid compounds comprising the structure of Formula (II).

$(HO)_n-R'-(COOH)_m$ <span>Formula (II):</span> wherein
R' is a divalent $C_1$-$C_{10}$ aliphatic hydrocarbon moiety, n and m are both integers and wherein n 0 and m 1.

The divalent $C_1$-$C_{10}$ aliphatic hydrocarbon moiety can comprise a linear/branched aliphatic moiety comprising 1 to 10 carbon atoms. Suitable examples of such $C_1$-$C_{10}$ aliphatic hydrocarbon moieties include methylene, ethylene, n-propylene, iso-propylene, n-butylene, isobutylene, n-amylene, n-decylene, 2-ethylhexylene, or combinations thereof. While the aforementioned $C_1$-$C_{10}$ aliphatic hydrocarbon moieties do comprise two available substitution sites, it is contemplated that additional hydrogens on the hydrocarbon could be replaced with further carboxyl and/or hydroxyl groups.

Suitable compounds that can be used as Component (v) include mono-carboxylic (such as formic, acetic, propionic, butyric) acid, hydroxyl-carboxylic (such as glycolic, lactic, 2-hydroxy butaric) acid, di-carboxylic (such as malonic, glutaric maleic) acid, and hydroxyl-polycarboxylic (such as citric) acid, AGS acid, or combinations thereof. AGS acid is a mixture of dicarboxylic acids (i.e., adipic acid, glutaric acid, and succinic acid) that is obtained as a by-product of the oxidation of cyclohexanol and/or cyclohexanone in the adipic acid manufacturing process Suitable AGS acid that may be used as Component (v) include RHODIACID AGS (available from Solvay S.A.), DIBASIC ACID (available from Invista S.á.r.l), "FLEXATRAC-AGS-200 (available from Ascend Performance Materials LLC), and Glutaric acid, technical grade (AGS) (available from Lanxess A.G.).

As used herein, a carboxylic acid shall be deemed hydrophilic when 25 gm or more (e.g., 40 gm or more or 60 gm or more) of the carboxylic acid is soluble per 100 gm of water at 25° C.

Formic acid, acetic acid and lactic acid are the preferred hydrophilic carboxylic acids. Formic acid and acetic acid are the most preferred hydrophilic carboxylic acids Component (v) can comprise 0.1% to 4% (e.g., 0.15% to 3.5% or 0.2% to 3%) by weight of the polyurethane insulation foam composition based on the total weight of the composition.

Component (vi): Halogenated Olefin Compound

The polyurethane insulation foam composition disclosed herein comprises a one or more halogenated olefin ("HFOs") compounds that serves as a blowing agent for the polyurethane foam composition.

The halogenated olefin compound used as Component (vi) comprises at least one haloalkene (e.g, fluoroalkene or chlorofluoroalkene) comprising from 3 to 4 carbon atoms and at least one carbon-carbon double bond. Suitable compounds that may be used as Component (vi) include hydrohaloolefins such as trifluoropropenes, tetrafluoropropenes (e.g., tetrafluoropropene (1234)), pentafluoropropenes (e.g., pentafluoropropene (1225)), chlorotrifloropropenes (e.g., chlorotrifloropropene (1233)), chlorodifluoropropenes, chlorotrifluoropropenes, chlorotetrafluoropropenes, hexafluorobutenes (e.g., hexafluorobutene (1336)), or combinations thereof. In certain embodiments, the tetrafluoropropene, pentafluoropropene, and/or chlorotrifloropropene compounds used as Component (vi) has no more than one fluorine or chlorine substituent connected to the terminal carbon atom of the unsaturated carbon chain (e.g., 1,3,3,3-tetrafluoropropene (1234ze); 1,1,3,3-tetrafluoropropene, 1,2,3,3,3-pentafluoropropene (1225ye), 1,1,1-trifluoropropene, 1,2,3,3,3-pentafluoropropene, 1,1,1,3,3-pentafluoropropene (1225zc), 1,1,2,3,3-pentafluoropropene (1225yc), (Z)-1,1,1,2,3-pentafluoropropene (1225yez), 1-chloro-3,3,3-trifluoropropene (1233zd), 1,1,1,4,4,4-hexafluorobut-2-ene (1336mzzm), or combinations thereof).

Other blowing agents that may be used in combination with the HFOs described above include air, nitrogen, carbon dioxide, hydrofluorocarbons ("HFCs"), alkanes, alkenes, mono-carboxylic acid salts, ketones, ethers, or combinations thereof. Suitable HFCs include 1,1-difluoroethane (HFC-152a), 1,1,1,2-tetrafluoroethane (HFC-134a), pentafluoroethane (HFC-125), 1,1,1,3,3-pentafluoropropane (HFC-245fa), 1,1,1,3,3-pentaflurobutane (HFC-365mfc), or combinations thereof. Suitable alkanes and alkenes include n-butane, n-pentane, isopentane, cyclopentane, 1-pentene, or combinations thereof. Suitable mono-carboxylic acid salts include methyl formate, ethyl formate, methyl acetate, or combinations thereof. Suitable ketones and ethers include acetone, dimethyl ether, or combinations thereof.

Component (vi) can comprise 2% to 10% (e.g., 2.5% to 9% or 3% to 8%) by weight of the polyurethane insulation foam composition based on the total weight of the composition.

Component (vii): Stabilizing Compound

The polyurethane insulation foam composition disclosed herein comprises one or more stabilizing compounds that assist in the overall stabilization of the polyurethane foam composition. For example, Component (vii) assists in the stabilization of a polyurethane foam composition that uses a compound having a electrophilic double bond (e.g., HFO-1233zd) as Component (v). Without Component (vii), there is a possibility of HFO-1233zd interacting with the tertiary amine compounds used in Component (iv) which are nucleophilic by design. These unintended interactions can lead to the formation of unwanted compounds in the composition thereby making it unstable. Component (vii) helps shield or prevent such interactions with HFO-1233zd thereby enhancing the overall stability of the polyurethane insulation foam composition. It is believed that, in some instances, Component (vii) forms a protective hydration layer around Component (iv) which shields the compound from HFO-1233zd.

Suitable compounds that can be used as Component (vii) include un-alkoxylated polyhydroxy compounds having 4 or more hydroxyl groups. Examples of such compounds are sugar and sugar alcohols including erythritol, arabitol, xylitol, sorbitol, mannitol, isomalt, lactitol, maltitol, xylose, glucose, fructose, sucrose, trehalose, lactose, raffinose, cyclodextrin, maltodextrin, corn syrup, amylopectin, or combinations thereof.

In certain embodiments, Component (vii) is present in less than 10 micro-moles (e.g., less than 5 micro-moles, less than 2 micro-moles) per 100 gm of the polyurethane foam composition. In yet other embodiments, a hydrophilic carboxylic acid compound (i.e., Component (v)) is present in the polyurethane insulation foam composition in an amount ranging from 0.2 to 4 (e.g., 0.25 to 2, 0.3 to 1.5, or 0.3 to 1) equivalents of carboxyl group per equivalent of tertiary amines in the tertiary amine compound (i.e., Component (iv)) while Component (vii) is present in an amount of less than 0.8 (e.g., less than 0.6, less than 0.5, or less than 0.4) moles per mole of Component (v).

Component (viii): Other Auxiliary Agents and Additives

The polyurethane insulation foam composition disclosed herein can comprise various auxiliary agents and additives that are known in the art of isocyanate-based insulation foam technology. Suitable additives include surfactant, fire retardants, smoke suppressants, cross-linking agents, viscosity reducer, infra-red pacifiers, cell-size reducing compounds, pigments, fillers, reinforcements, mold release agents, antioxidants, dyes, pigments, antistatic agents, biocide agents, or combinations thereof.

Examples of suitable flame retardants that may be used in the polyurethane insulation foam composition disclosed herein include organo-phosphorous compounds (e.g., organic phosphates, phosphites, phosphonates, polyphosphates, polyphosphites, polyphosphonates), ammonium polyphosphates (e.g., triethyl phosphate, diethy ethyl phosphonate, and tris(2-chloropropyl)-phosphate); and halogenated fire retardants (e.g., tetrabromophthalate esters and chlorinated parrafins).

Examples of other suitable auxiliary agents and additives that may be used in the polyurethane insulation foam composition disclosed herein include triethanolamine and glycerol cross linking agents; propylene carbonate and 1-methyl-2-pyrrolidinone viscosity reducers; carbon black, titanium dioxide, and metal flake infra-red opacifiers; inert, insoluble fluorinated compounds, and perfluorinated cell-size reducing compounds; calcium carbonate fillers; glass fibers and/or ground up foam waste reinforcing agents; zinc stearate mold release agents; butylated hydroxy toluene antioxidants; azo-/diazo dyestuff and phthalocyanines pigments.

In certain embodiments, the surfactants used in the foam composition of the present disclosure can comprise one or more silicone or non-silicone based surfactants. These surfactants are typically used to control the size of the cells that form as the foam composition reacts to form the polyurethane foam product thereby allowing for the control of the internal cell structure of the foam product. In certain embodiments, a foam comprising a uniform set of small sized cells (e.g., <300 μm) is desired because the foam will exhibit outstanding physical properties (e.g., compressive strength and thermal conductivity properties). Additionally, the aforementioned surfactants will also assist in the stabilization of the internal cells thereby ensuring that the cells do not collapse as the composition reacts to form the polyurethane foam product.

Suitable silicone surfactants that can be used in the polyurethane insulation foam composition disclosed herein include polyorganosiloxane polyether copolymers and polysiloxane polyoxyalkylene block co-polymers (e.g., Momentive's L-5345, L-5440, L-6100, L-6642, L-6900, L-6942, L-6884, L-6972 and Evonik Industries AG's DC-193, DC5357, Si3102, Si3103, Tegostab B8490; B8496, B8536; B84205; B84210; B84501; B84701, B84715). Others silicone surfactants that can be used also are disclosed in U.S. Pat. No. 8,906,974 and U.S. Patent Publication No. US 2016/0311961.

Non-silicone surfactants that can be used in the polyurethane insulation foam composition disclosed herein include non-ionic, anionic, cationic, ampholytic, semi-polar, zwitterionic organic surfactants. Suitable non-ionic surfactants include phenol alkoxylates and alkylphenol alkoxylates (e.g., ethoxylated phenol and ethoxylated nonylphenol, respectively). Other useful non-silicone non-ionic surfactants include LK-443 (available from Evonik Industries AG) and VORASURF 504 (available from Dow Chemicals).

Component (viii) can comprise 0.5% to 10% (e.g., 0.8% to 9% or 1% to 8%) by weight of the polyurethane insulation foam composition based the total weight of the composition.

In some embodiments, the polyurethane insulation foam composition does not contain a guanidine compound.

Processing

A polyurethane insulation foam product (e.g., a closed-cell polyurethane insulation foam product) may be made from the polyurethane insulation foam composition disclosed herein via a one component, two component, or multi-component (i.e., greater than two component) system. As used herein, a polyurethane foam product shall be deemed to be a "closed cell" foam if the closed cell content of such foam is greater than 70% (e.g., 80% or 85%) as measured by ASTM D6226-15. Moreover, in certain embodiments, the polyurethane insulation foam product of the present disclosure would exhibit a thermal conductivity value (K-value) ranging from 0.10 to 0.16 Btu-in/hr·ft$^{2\circ}$ F. (e.g., 0.11 to 0.15 Btu-in/hr·ft$^{2\circ}$ F. or 0.12 to 0.1416 Btu-in/hr·ft$^{2\circ}$ F.) as measured by ASTM C518-17 at average plate temperature of 75° F. In a two component system, the B-Side of the polyurethane insulation foam composition, which is typically in a liquid state, is mixed with the A-Side of the composition thereby activating polymerization of the reaction system. As will be understood by one skilled in the art, Component (i) of the polyurethane insulation foam composition disclosed herein will be in the A-Side of a two component system while Component (ii) will be in the B-Side. However, it is noted that Components (iv), (v), (vi), (vii) and (viii) can be added to one or both of the A-Side and B-Side. In other words, Components (iv)-(viii) can be combined with one or both of Components (i) and (ii) simply based on the chemical and physical compatibility of the those compounds with Components (i) and (ii).

Regardless of the number of components used in connection with the polyurethane insulation foam composition disclosed herein, the relative proportions of the components may be metered, either by weight or by volume, to provide a ratio of free isocyanate groups to the total of the isocyanate-reactive groups ranging from 0.9 to 5 (e.g., 0.95 to 4 or 1 to 3.5) based on the total isocyanate and isocyanate reactive compounds present in the polyurethane insulation foam composition.

In certain embodiments, a polyurethane foam product may be made using the polyurethane insulation foam composition and a one-shot, prepolymer or semi-prepolymer technique together with a mixing method such as impingement mixing. In other embodiments, after mixing, the polyurethane insulation foam composition (while still in a substantially liquid state) may be dispensed into a cavity (i.e., cavity filling), molded, open poured (e.g., process for making slabstock), sprayed, frothed, or laminated with facing materials such as paper, metal, plastics, or wood-board. Such foam products are useful in any insulating surfaces or enclosures such as houses, roofing, buildings, refrigerators, freezers, appliances, piping, and vehicles.

The preparation of polyurethane foams using the compositions described herein may follow any of the methods well known in the art can be employed (e.g., see Saunders and Frisch, Volumes I and II Polyurethanes Chemistry and technology, 1962, John Wiley and Sons, New York, N.Y.; or Oertel, Polyurethane Handbook 1985, Hanser Publisher, New York; or Randall and Lee, The Polyurethanes Book 2002).

Polyisocyanurate Foam Product

While the present disclosure has been focused on a polyurethane insulation foam composition and the resulting polyurethane foam product (e.g., a rigid, closed-cell polyurethane insulation foam product), the composition can also be used to form a polyisocyanurate foam product (e.g., a rigid, closed-cell polyisocyanurate foam product) simply by adding one or more trimerization catalysts to the reactive system disclosed herein. Suitable isocyanate trimerization catalysts that may be added to Components (i)-(viii) include those listed above. Accordingly, in some embodiments, the polyurethane insulation foam composition is a polyisocyanurate insulation foam composition. It is noted that the polyisocyanurate insulation foam composition would form a polyisocyanurate foam product that comprises both polyisocyanurate and polyurethane reaction products.

In certain embodiments, the relative proportions of the components used to form the polyisocyanurate insulation foam composition may be metered, either by weight or by volume, to provide a ratio of free isocyanate groups to the total of the isocyanate-reactive groups in a range of from ranging from 2 to 5 (e.g., 2.25 to 4) based on the total isocyanate and isocyanate reactive compounds present in the polyurethane insulation foam composition.

Modifications

While specific embodiments of the disclosure have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosure which is to be given the full breadth of the claims appended and any and all equivalents thereof. Therefore, any of the features and/or elements which are listed above may be combined with one another in any combination and still be within the breadth of this disclosure.

Examples

Components:

The following compounds are referred to in the examples:

Polyol 1: A polyether polyol having an OH value of 360 mg KOH/g made by propoxylation of mixture of sucrose and diethylene glycol Polyol 2: A polyether polyols made by propoxylation of mixture of polymethylene polyphenylene polyamine and diethylene glycol and blended with a viscosity reducer to give an OH value of 291 mg KOH/g Polyol 3: A polyether polyol having an OH value of 650 mg KOH/g made by propoxylation of glycerol Polyol 4: A polyether polyol having an OH value of made by propoxylation of a mixture of polymethylene polyphenylene polyamine and diethylene glycol.

Polyol 5: A polyether polyol having an OH value of 437 mg KOH/g made by propoxylation of a mixture of polymethylene polyphenylene polyamine and diethylene glycol and blended with a viscosity reducer to give an.

Sucrose: available from Research Products International

DABCO® 2040: A low odor amine catalyst used to enhance cure and adhesion in rigid polyurethane foam available from Evonik Industries AG.

JEFFCAT® ZF-20: Bis-(2-dimethylaminoethyl)ether catalyst available from Huntsman Petrochemical LLC.

POLYCAT® 203: An amine based catalyst available from Evonik Nutrition & Care GmbH JEFFCAT® DMCHA: N,N-dimethylcyclohexylamine catalyst available from Huntsman Petrochemical LLC.

JEFFCAT® PMDETA: Pentamethyldiethylenetriamine catalyst available from Huntsman Petrochemical LLC.

JEFFCAT® ZF-10: N,N,N'-trimethyl-N'-hydroxyethyl-bisaminoethylether catalyst available from Huntsman Petrochemical LLC.

JEFFCAT® Z-110: N,N,N'-trimethylaminoethyl-ethanolamine catalyst available from Huntsman Petrochemical LLC.

JEFFCAT® DMEA: N,N-dimethylethanolamine catalyst available from Huntsman Petrochemical LLC.

JEFFCAT® ZR-70: 2-(2-dimethylaminoethoxy)ethanol catalyst available from Huntsman Petrochemical LLC.

Formic acid: Available from Aldrich Chemical.

D-Sorbitol: available from Research Products International.

TEGOSTAB® EP-A-69: A hydrolysis-resistant silicone surfactant available from Evonik Industries AG.

TEGOSTAB© B8491: A hydrolysis-resistant silicone surfactant available from Evonik Industries AG.

HFO-1233zd(E): 1-chloro-3,3,3-trifluoropropene available from Honeywell International Inc. as Solstice® LBA.

RUBINATE M: Polymeric MDI having an NCO value of 30.5% available from Huntsman International LLC.

Description of the FOAM REACTIVITY TEST:

A composition's (e.g., the compositions described in Table 1) REACTIVE SHIFT (i.e., CT REACTIVE SHIFT as calculated by FormulaX, TFT REACTIVE SHIFT as calculated by Formula Y, and EOR REACTIVE SHIFT as calculated by Formula Z) was calculated through the use various data points gathered via the FOAM REACTIVITY TEST. The FOAM REACTIVITY TEST comprises the following steps: (i) equilibrating a composition's A-Side (polyol premix) and B-Side (isocyanate) to 15° C. by placing the A- and B-Side in a cooling thermostat (e.g., LAUDA Alpha RA 24 Cooling thermostat) (ii) pouring the contents of the equilibrated A-Side and B-Side into a 32-oz non-waxed paper cup (e.g., Solo H4325-2050) thereby combining the two components; (ii) mixing the combined components for 4 seconds at 2500 rpm using a mechanical mixer (e.g., Caframo BDC3030 stirrer); (iii) allowing the components of the composition to react thereby forming the polyurethane foam product; and (iv) measuring one or more of the composition's CT, TFT, and/or EOR (each defined below) during the formation of the polyurethane foam product.

For purposes of this disclosure, the following terms shall be defined as follows:

Cream Time ("CT") means the elapsed time between the moment a composition's isocyanate component is mixed with the composition's isocyanate reactive component and the formation of the fine froth or cream in the composition.

Tack Free Time ("TFT") means the elapsed time between the moment a composition's isocyanate component is mixed with the composition's isocyanate reactive component and the point at which the outer skin of the foam loses its stickiness or adhesive quality. Experimentally, such loss of stickiness is when a 6" wooden tongue depressor (e.g., Puritan 705) is brought into contact with the surface of the reaction mixture and appears non-sticky when it is removed from the surface.

End of Rise Time ("EOR") means the elapsed time between the moment a composition's isocyanate component is mixed with the composition's isocyanate reactive component and the point at which the foam rise is complete.

Calculation of REACTIVE SHIFT:

A composition's CT REACTIVE SHIFT was calculated using Formula X:

$$\text{CT REACTIVE SHIFT} = 100 * [(CT_{79} - CT_0)/CT_0] \quad \text{Formula X:}$$

wherein $CT_{79}$ means a composition's CT as determined using the FOAM REACTIVITY TEST after the composition's B-Side has been aged at 40° C. in a closed, pressure-rated, glass container (e.g., ACE GLASS Pressure Bottle (#8648-251)) that was placed in an oven (e.g., VWR 1370GM oven) for 79 days.

$CT_0$ means a composition's CT as determined using the FOAM REACTIVITY TEST after the composition's B-Side has been aged at 40° C. in a closed, pressure-rated, glass container (e.g., ACE GLASS Pressure Bottle (#8648-251)) that was placed in an oven (e.g., VWR 1370GM oven) for 0 days.

A composition's TFT REACTIVE SHIFT was calculated using Formula Y:

$$\text{TFT REACTIVE SHIFT} = 100 * [(TFT_{79} - TFT_0)/TFT_0] \quad \text{Formula Y:}$$

wherein $TFT_{79}$ means a composition's TFT as determined using the FOAM REACTIVITY TEST after the composition's B-Side has been aged at 40° C. in a closed, pressure-rated, glass container (e.g., ACE GLASS Pressure Bottle (#8648-251)) that was placed in an oven (e.g., VWR 1370GM oven) for 79 days.

$TFT_0$ means a composition's TFT as determined using the FOAM REACTIVITY TEST after the composition's B-Side has been aged at 40° C. in a closed, pressure-rated, glass container (e.g., ACE GLASS Pressure Bottle (#8648-251)) that was placed in an oven (e.g., VWR 1370GM oven) for 0 days.

A composition's EOR REACTIVE SHIFT was calculated using Formula Z:

$$\text{EOR REACTIVE SHIFT} = 100 * [(EOR_{79} - EOR_0)/EOR_0] \quad \text{Formula Z:}$$

wherein $EOR_{79}$ means a composition's EOR as determined using the FOAM REACTIVITY TEST after the composition's B-Side has been aged at 40° C. in a closed, pressure-rated, glass container (e.g., ACE GLASS Pressure Bottle (#8648-251)) that was placed in an oven (e.g., VWR 1370GM oven) for 79 days.

$EOR_0$ means a composition's EOR as determined using the FOAM REACTIVITY TEST after the composition's B-Side has been aged at 40° C. in a closed, pressure-rated, glass container (e.g., ACE GLASS Pressure Bottle (#8648-251)) that was placed in an oven (e.g., VWR 1370GM oven) for 0 days.

It should be noted that in some embodiments, the temperature used to age a composition's B-side as described above can range from 30° C. to 40° C. (e.g., 30° C. to 55° C.).

Table 1:

Table 1 shows various data points for four polyurethane compositions used to make a polyurethane foam product. The B-side for each composition was aged at 40° C. in a in an ACE GLASS Pressure Bottle (#8648-251) and placed in a VWR 1370GM oven for the total number of days listed in Table 1. When a particular day was reached (e.g., at Day 22, 57 or 79), the B-side was taken out of the oven and placed in a water bath at 15° C. Once the polyol premix reached bath temperature, visual inspection of the polyol premix was made to assess whether it was clear or cloudy and whether a precipitate (abbreviated as "ppt" in the Tables disclosed herein) can be seen at the bottom of container. After the visual inspection, a foam product was made using the steps of the FOAM REACTIVITY TEST (described above) and the composition's REACTIVE SHIFT (i.e., CT REACTIVE SHIFT as calculated by Formula X, TFT REACTIVE SHIFT as calculated by Formula Y, and EOR REACTIVE SHIFT as calculated by Formula Z) was calculated using data points measured during the FOAM REACTIVE TEST.

It should be noted that a foam product was made for each day that is represented in the Tables (e.g., Day 0, 22, 57, or 79).

TABLE 1

|  | Formulations | |
| --- | --- | --- |
| Foams | A | B |
| Polyol Premix | | |
| Polyol 1 | 49.5 | 49.5 |
| Polyol 2 | 11.6 | 11.6 |
| Polyol 3 | 20.7 | 20.7 |
| TEGOSTAB ® EP-A-69 | 2.0 | 2.0 |
| DABCO ® 2040 | 1.5 | 1.5 |
| JEFFCAT ® ZF-20 | 0.1 | 0.1 |
| Formic acid | 0.9 | 0.9 |
| Water | 1.9 | 1.9 |
| Sucrose | 0.5 | |
| D-Sorbitol | | 0.5 |
| HFO-1233zd[E] | 11.3 | 11.3 |
| Total Polyol Premix | 100.0 | 100.0 |
| Isocyanate | | |
| Rubinate M | 148.5 | 148.5 |
| Isocyanate/Premix ratio | 1.49 | 1.49 |
| Aging time at 40° C., (days) | 0 | 0 |
| Foam CT/GT/TFT (sec)* | 10/81/123 | 10/83/126 |
| Free Rise Density, pcf | 1.88 | 1.81 |
| Aging time at 40° C., (days) | 22 | 22 |
| Foam CT/GT/TFT (sec)* | 10/80/127 | 10/82/127 |
| Free Rise Density, pcf | 1.88 | 1.78 |
| Aging time at 40° C., (days) | 57 | 57 |
| Foam CT/GT/TFT (sec)* | 11/81/124 | 11/82/125 |
| Free Rise Density, pcf | 1.87 | 1.81 |
| Aging time at 40° C., (days) | 79 | 79 |
| Foam CT/GT/TFT (sec)* | 12/82/128 | 12/84/129 |
| Free Rise Density, pcf | 1.85 | 1.78 |
| CT REACTIVITY SHIFT** | 20 | 20 |
| GT REACTIVITY SHIFT** | 1 | 1 |
| TFT REACTIVITY SHIFT** | 4 | 2 |

*CT, GT & TFT are defined above
**Calculated as described above

It should also be noted that the foam products made from the compositions for Foams A and B (all of which represent certain embodiments of the present disclosure) had internal excellent appearance (e.g., uniform internal cell size and free of internal voids) and had fine internal cells with no evidence of cell collapse. In other words, good quality foam product was produced using the compositions disclosed herein irrespective of whether the polyol premix used was fresh or aged.

Table 2:

Table 2 shows various data points for three polyurethane compositions used to make a polyurethane foam product. The preparation procedures used in connection with the polyurethane compositions listed in Table 1 were followed for these polyurethane compositions except the exact days when the B-side was taken out of the oven and placed in a water bath was at Day 11, 14, 49, or 79. It is noted that these polyurethane compositions did not use one or more embodiments of the present disclosure. More specifically, Formulation "C" did not use Component (vii) (i.e., a stabilizing compound); Formulation "E" did not use Component (v) (i.e., a hydrophillic carboxylic acid compound); and Formulation "D" did not use either Component (vii) or Component (v).

TABLE 2

| Foams | Formulations | | |
|---|---|---|---|
| | C | D | E |
| Polyol Premix | | | |
| Polyol 1 | 49.4 | 49.6 | 49.4 |
| Polyol 2 | 11.6 | | |
| Polyol 3 | 20.7 | 20.8 | 20.7 |
| Polyol 4 | | 6.8 | 6.8 |
| TEGOSTAB ® EP-A-69 | 2.0 | | |
| TEGOSTAB ® B8491 | | 1.6 | 1.6 |
| DABCO ® 2040 | 1.6 | | |
| POLYCAT ® 203 | | 0.9 | 0.9 |
| JEFFCAT ® ZF-20 | 0.1 | 0.4 | 0.4 |
| Formic acid | 0.9 | | |
| Water | 2.3 | 1.7 | 1.7 |
| Sucrose | | 0.0 | 0.5 |
| HFO-1233zd[E] | 11.3 | 18.2 | 18.1 |
| Total Polyol Premix | 100.0 | 100.0 | 100.0 |
| Isocyanate | | | |
| Rubinate M | 148.40 | 141.00 | 141.00 |
| Isocyanate/Premix ratio | 1.48 | 1.41 | 1.41 |
| Aging time at 40° C., (days) | 0 | 0 | 0 |
| Foam CT/GT/TFT (sec)* | 10/78/130 | 10/96/129 | 10/98/134 |
| Free Rise Density, pcf | 1.85 | 1.83 | 1.77 |
| Aging time at 40° C., (days) | 14 | 11 | 11 |
| Foam CT/GT/TFT (sec)* | 11/83/135 | 14/144/237 | 13/124/178 |
| Free Rise Density, pcf | 1.83 | 1.86 | 1.79 |
| Aging time at 40° C., (days) | 49 | | |
| Foam CT/GT/TFT (sec)* | 11/86/132 | | |
| Free Rise Density, pcf | 1.80 | | |
| Aging time at 40° C., (days) | 79 | | |
| Foam CT/GT/TFT (sec)* | 13/88/136 | | |
| Free Rise Density, pcf | 1.84 | | |
| CT REACTIVITY SHIFT** | 30 | >>40 | >>30 |
| GT REACTIVITY SHIFT** | 13 | >>50 | >>27 |
| TFT REACTIVITY SHIFT** | 5 | >>84 | >>33 |

*CT, GT & TFT are defined above
**Calculated as described above

When fresh (i.e. Day 0 or non-aged) polyol premix was used, the polyurethane foam products made from Formulations C, D and E had a uniform small cell structure with no voids. There was a loss in reactivity of Foam C as the aging time increased (see CT, GT and TFT reactivity shift of 30, 13, 5, respectively after 79 days of pre-blend aging at 40° C.).

For Formulations D and E the loss in reactivity was very large just after 11 days of pre-blend aging time. After just 11 days of pre-blend aging, the foam products made from Formulations D and E had a very poor appearance (e.g., course internal cells, many internal voids and evidence of cell collapse). In other words, a poor quality foam product was produced from Formulations D and E even though the pre-blend aging time was just 11 days. Due to these results, the aging of Formulations D and E was discontinued after 11 days, but it is reasonable to assume that a loss in reactivity would have continued (see CT, GT and TFT reactivity shift was significantly higher than 40, 50, 84, respectively, for Foam D and 30, 27, 33 respectively, for Foam E).

Table 2 shows that the foam compositions that did not use one or more embodiments of the present disclosure exhibited a significant loss in reactivity and in some cases foam collapse when pre-blend was aged.

Table 3:

Table 3 shows various data points for five polyurethane compositions used to make a polyurethane foam product per teachings of the present disclosure.

TABLE 3

| Foams | Formulations | | | | |
|---|---|---|---|---|---|
| | F | G | H | I | J |
| Polyol Premix | | | | | |
| Polyol 1 | 51.3 | 51.3 | 51.2 | 51.0 | 51.3 |
| Polyol 5 | 8.0 | 8.0 | 8.0 | 8.0 | 8.0 |
| Polyol 3 | 21.5 | 21.5 | 21.4 | 21.3 | 21.4 |
| TEGOSTAB ® EP-A-69 | 2.1 | 2.1 | 2.1 | 2.1 | 2.1 |
| DABCO ® 2040 | 1.8 | 1.8 | 1.8 | 1.8 | 1.8 |
| JEFFCAT ® PMDETA | 0.2 | | | | |
| JEFFCAT ® ZF-10 | | 0.2 | | | |
| JEFFCAT ® Z-110 | | | 0.5 | | |
| JEFFCAT ® DMEA | | | | 0.9 | |
| JEFFCAT ® ZR-70 | | | | | 0.3 |
| Formic acid | 1.0 | 1.0 | 1.0 | 1.0 | 1.0 |
| Water | 1.8 | 1.8 | 1.8 | 1.8 | 1.8 |
| Sucrose | | | | | |
| D-Sorbitol | 0.5 | 0.5 | 0.5 | 0.5 | 0.5 |
| HFO-1233zd[E] | 11.8 | 11.8 | 11.7 | 11.7 | 11.7 |
| Total Polyol Premix | 100.0 | 100.0 | 100.1 | 100.0 | 100.0 |
| Isocyanate | | | | | |
| Rubinate M | 154.7 | 154.7 | 154.4 | 153.6 | 154.5 |
| Isocyanate/Premix ratio | 1.55 | 1.55 | 1.54 | 1.54 | 1.55 |
| Aging time at 40° C., (days) | 0 | 0 | 0 | 0 | 0 |
| Foam CT/GT/TFT (sec)* | 11/81/114 | 11/82/116 | 11/83/117 | 11/84/122 | 11/85/122 |
| Free Rise Density, pcf | 2.00 | 2.01 | 1.99 | 2.00 | 2.00 |
| Aging time at 40° C., (days) | 29 | 29 | 29 | 29 | 29 |
| Foam CT/GT/TFT (sec)* | 11/81/114 | 11/86/124 | 11/85/116 | 11/87/124 | 11/87/124 |
| Free Rise Density, pcf | 1.92 | 2.02 | 1.97 | 2.00 | 2.00 |
| Aging time at 40° C., (days) | 48 | 48 | 48 | 48 | 48 |

TABLE 3-continued

| Foams | Formulations | | | | |
|---|---|---|---|---|---|
| | F | G | H | I | J |
| Foam CT/GT/TFT (sec)* | 10/83/120 | 11/86/124 | 10/85/122 | 11/86/127 | 10/84/124 |
| Free Rise Density, pcf | 1.98 | 2.03 | 1.98 | 1.98 | 2.00 |
| Aging time at 40° C., (days) | 79 | 79 | 79 | 79 | 79 |
| Foam CT/GT/TFT (sec)* | 11/81/116 | 12/85/122 | 12/85/122 | 11/85/125 | 12/87/125 |
| Free Rise Density, pcf | 2.02 | 2.02 | 2.06 | 1.98 | 2.02 |
| CT REACTIVITY SHIFT** | 0 | 9 | 9 | 0 | 9 |
| GT REACTIVITY SHIFT** | 0 | 4 | 2 | 1 | 2 |
| TFT REACTIVITY SHIFT** | 2 | 5 | 4 | 2 | 2 |

*CT, GT & TFT are defined above
**Calculated as described above

Reactivity shifts for Formulations F, G, H, I and J were low and good quality foam products were made irrespective of the age of the polyol premix used. The foams had excellent internal appearance (e.g., uniform internal cell size and free of internal voids) with uniform cell size and free of voids.

Table 4:

Table 4 shows various data points for two additional polyurethane compositions used to make a polyurethane foam product according to embodiments of the present disclosure

TABLE 4

| Foams | Formulations | |
|---|---|---|
| | K | L |
| Polyol Premix | | |
| Polyol 1 | 49.1 | 48.8 |
| Polyol 2 | 11.5 | 11.5 |
| Polyol 3 | 20.5 | 20.4 |
| TEGOSTAB ® EP-A-69 | 2.0 | 2.0 |
| DABCO ® 2040 | 0.3 | 0.0 |
| JEFFCAT ® DMCHA | 1.9 | 2.9 |
| JEFFCAT ® ZF-20 | 0.1 | 0.1 |
| Formic acid | 0.9 | 1.2 |
| D-Sorbitol | 0.5 | 0.5 |
| Water | 1.7 | 1.4 |
| HFO-1233zd[E] | 11.3 | 11.2 |
| Total Polyol Premix | 100.0 | 100.0 |
| Isocyanate | | |
| Rubinate M | 148.1 | 147.2 |
| Isocyanate/Premix ratio | 1.48 | 1.47 |
| Aging time at 40° C., (days) | 0 | 0 |
| Foam CT/GT/TFT (sec)* | 14/85/126 | 14/79/113 |
| Free Rise Density, pcf | 1.88 | 1.91 |
| Aging time at 40° C., (days) | 29 | 29 |
| Foam CT/GT/TFT (sec)* | 13/84/122 | 12/78/114 |
| Free Rise Density, pcf | 1.85 | 1.89 |
| Aging time at 40° C., (days) | 43 | 43 |
| Foam CT/GT/TFT (sec)* | 14/85/121 | 14/79/114 |
| Free Rise Density, pcf | 1.88 | 1.94 |
| Aging time at 40° C., (days) | 79 | 79 |
| Foam CT/GT/TFT (sec)* | 14/82/122 | 14/76/112 |
| Free Rise Density, pcf | 1.91 | 1.94 |
| CT REACTIVITY SHIFT** | 0 | 0 |
| GT REACTIVITY SHIFT** | -4 | -4 |
| TFT REACTIVITY SHIFT** | -3 | -1 |

*CT, GT & TFT are defined above
**Calculated as described above

Formulations Foams K and I made good quality foam irrespective of whether the polyol premix used was fresh or aged. The foam had good internal appearance with uniform cell size and free of voids.

What is claimed is:

1. A polyurethane insulation foam composition comprising:
   (i) an aromatic isocyanate compound;
   (ii) an isocyanate reactive compound;
   (iii) water;
   (iv) a tertiary amine compound;
   (v) a hydrophilic carboxylic acid compound selected from, a hydroxyl-carboxylic acid, a hydroxyl-polycarboxylic acid, AGS acid and a combination thereof;
   (vi) a halogenated olefin blowing agent; and
   (vii) a stabilizing compound wherein the stabilizing compound comprises an un-alkoxylated polyhydroxy compound having 4 or more hydroxyl groups; and
   (viii) optionally, other additives;
   wherein Component (v) is present in the polyurethane insulation foam composition in an amount ranging from 0.2 to 4 equivalents of carboxyl group per equivalent of tertiary amines in Component (iv) and Component (vii) is present in an amount of less than 0.8 moles per mole of Component (v).

2. The polyurethane insulation foam composition according to claim 1, wherein the aromatic isocyanate compound comprises diphenylmethane diisocyanate, polyphenylene polymethylene polyisocyanate, tolylene diisocyanate, 1,5-naphtalenediisocyanate, p-phenylenediisocyanate, tolidine diisocyanate, or combinations thereof.

3. The polyurethane insulation foam composition according to claim 1, wherein Component (ii) comprises a polyether polyol, a polyester polyol, a hydroxyl-terminated polythioether, a polyamine, a polythiol, a glycol, or combinations thereof.

4. The polyurethane insulation foam composition according to claim 1, wherein Component (iv) further comprises of bis-(2-dimethylaminoethyl)ether; N,N,N'-trimethyl-N'-hydroxyethylbisaminoethylether; N,N-dimethylethanolamine; N, N-dimethylcyclohexylamine; N-methyldicyclohexylamine; benzyldimethylamine; pentamethyldiethylenetriamine; N,N,N',N'',N''-pentamethyldipropylenetriamine; N'-(3-(dimethylamino)propyl-N,N-di methyl-1,3-propanediamine; 2-(2-dimethylaminoethoxy)ethanol; N,N,N'-trimethylaminoethylethanolamine; 2-[N-(dimethylaminoethoxyethyl)-N-methylamino]ethanol; N,N,N'-trimethyl-N'-3-aminopropyl-bis(aminoethyl) ether; N,N,N',N'-tetramethylenediamine; N-ethylmorpholine; 2,2'dimorpholinodiethylether; 1,3,5-tris(3-(dimethylamino)propyl)-hexahydro-s-triazine; 1,2-dimethlyimidazol; N-methyl-, N'-(2-dimethylamino)ethyl-piperazine; N, N-dimethylaminoethyl morpholine, triethylene diamine or combinations thereof.

5. The polyurethane insulation foam composition according to claim 1, wherein the hydroxyl-carboxylic acid and hydroxyl-polycarboxylic acid comprise structures having the following formula:

$$(HO)_n-R'-(COOH)_m$$

wherein R' is a divalent $C_1$-$C_{10}$ aliphatic hydrocarbon moiety, n and m are both integers and wherein n≥1 and m≥1.

6. The polyurethane insulation foam composition according to claim 1, further comprising formic acid, acetic acid, lactic acid or a combination thereof.

7. The polyurethane insulation foam composition according to claim 1, wherein Component (vi) comprises a trifluoropropene, a tetrafluoropropene, a pentafluoropropene, a chlorotrifloropropene, a chlorodifluoropropene, a chlorotetrafluoropropene, a hexafluorobutene, or combinations thereof.

8. The polyurethane insulation foam composition according to claim 1, wherein Component (vi) comprises trans-1-chloro-3,3,3-trifluoropropene; (z)-1,1,1,4,4,4-hexafluorobut-2-ene; trans-1,3,3,3-tetrafluoroprop-1-ene or combinations thereof.

9. The polyurethane insulation foam composition according to claim 1, wherein Component (vii) comprises erythritol, arabitol, xylitol, sorbitol, mannitol, isomalt, lactitol, maltitol, xylose, glucose, fructose, sucrose, trehalose, lactose, raffinose, cyclodextrin, maltodextrin, corn syrup, amylopectin, or combinations thereof.

10. The polyurethane insulation foam composition according to claim 1, wherein Component (viii) comprise a secondary blowing agent comprising air, nitrogen, carbon dioxide, a hydrofluoroalkane, an alkane, an alkene, a monocarboxylic acid salt, a ketone, an ether, or combinations thereof.

11. A method of making a polyurethane foam product from a polyurethane insulation foam composition comprising:
    reacting the following reactive ingredients of a polyurethane insulation foam composition to form the polyurethane foam product:
    (i) an aromatic isocyanate compound;
    (ii) an isocyanate reactive compound;
    (iii) water;
    (iv) a tertiary amine compound;
    (v) a hydrophilic carboxylic acid selected from a hydroxyl-carboxylic acid, a hydroxyl-polycarboxylic acid, AGS acid and a combination thereof;
    (vi) a halogenated olefin blowing agent;
    (vii) a stabilizing compound wherein the stabilizing compound comprises an un-alkoxylated polyhydroxy compound having 4 or more hydroxyl groups; and
    (viii) optionally, other additives;
wherein Component (v) is present in the polyurethane insulation foam composition in an amount ranging from 0.2 to 4 equivalents of carboxyl group per equivalent of tertiary amines in Component (iv) and Component (vii) is present in an amount of less than 0.8 moles per mole of Component (v);
wherein a CT REACTIVITY SHIFT of the polyurethane insulation foam composition is less than or equal to 20 and a TFT REACTIVITY SHIFT is less than or equal to 4; and wherein the CT REACTIVITY SHIFT and the TFT REACTIVITY SHIFT of the polyurethane insulation foam composition is determined by using Formulas X and Y, respectively:

CT REACTIVE SHIFT=$100*[(CT_{79}-CT_0)/CT_0]$  Formula X:

wherein
$CT_{79}$ means a composition's CT as determined using the FOAM REACTIVITY TEST after the composition's B-Side comprising Components (ii) and (iii) has been aged at 40° C. in a closed, pressure-rated, glass container that was placed in an oven for 79 days,
$CT_0$ means a composition's CT as determined using the FOAM REACTIVITY TEST after the composition's B-Side comprising Components (ii) and (iii) has been aged at 40° C. for 0 days,
and TFT REACTIVE SHIFT=$100*[(TFT_{79}-TFT_0)/TFT_0]$  Formula Y:

wherein
$TFT_{79}$ means a composition's TFT as determined using the FOAM REACTIVITY TEST after the composition's B-Side comprising Components (ii) and (iii) has been aged at 40° C. in a closed, pressure-rated, glass container that was placed in an oven for 79 days,
$TFT_0$ means a composition's TFT as determined using the FOAM REACTIVITY TEST after the composition's B-Side comprising Components (ii) and (iii) has been aged at 40° C. for 0 days.

12. The method according to claim 11, wherein the aromatic isocyanate compound comprises diphenylmethane diisocyanate, polyphenylene polymethylene polyisocyanate, tolylene diisocyanate, 1,5-naphtalenediisocyanate, p-phenylenediisocyanate, tolidine diisocyanate, or combinations thereof.

13. The method according to claim 11, wherein Component (ii) comprises a polyether polyol, polyester polyol, hydroxyl-terminated polythioethers, polyamines, polythiols, glycols, or combinations thereof.

14. The method according to claim 11, wherein Component (iv) further comprises wherein Component (iv) further comprises of bis-(2-dimethylaminoethyl)ether; N,N,N'-trimethyl-N'-hydroxyethylbisaminoethylether; N,N-dimethylethanolamine; N,N-dimethylcyclohexylamine; N-methyldicyclohexylamine; benzyldimethylamine; pentamethyldiethylenetriamine; N,N,N',N'',N''-pentamethyldipropylenetriamine; N'-(3-(dimethylamino)propyl-N,N-di methyl-1,3-propanediamine; 2-(2-dimethylaminoethoxy) ethanol; N,N,N'-trimethylaminoethyl-ethanolamine; 2-[N-(dimethylaminoethoxyethyl)-N-methylamino]ethanol; N,N, N'-trimethyl-N'-3-aminopropyl-bis(aminoethyl) ether; N,N, N',N'-tetramethylenediamine; N-ethylmorpholine; 2,2'dimorpholinodiethylether; 1,3,5-tris(3-(dimethylamino) propyl)-hexahydro-s-triazine; 1,2-dimethlyimidazol; N-methyl-,N'-(2-dimethylamino)ethyl-piperazine; N,N-dimethylaminoethyl morpholine and triethylene diamine combinations thereof.

15. The method according to claim 11, wherein the polyurethane foam composition further comprises formic acid, acetic acid, lactic acid or combinations thereof.

16. The method according to claim 11, wherein Component (vi) comprises trifluoropropenes, tetrafluoropropenes, pentafluoropropenes, chlorotrifloropropenes, chlorodifluoropropenes, chlorotrifluoropropenes, chlorotetrafluoropropenes, hexafluorobutenes, or combinations thereof.

17. The method according to claim 11, wherein Component (vi) comprises trans-1-chloro-3,3,3-trifluoropropene; (z)-1,1,1,4,4,4-hexafluorobut-2-ene; trans-1,3,3,3-tetrafluoroprop-1-ene or combinations thereof.

18. The method according to claim 11, wherein Component (viii) comprise a secondary blowing agent comprising air, nitrogen, carbon dioxide, hydrofluoroalkanes, alkanes, alkenes, mono-carboxylic acid salts, ketones, ethers, or combinations thereof.

19. A polyurethane insulation foam composition comprising:
   (i) an aromatic isocyanate compound;
   (ii) an isocyanate reactive compound;
   (iii) water;
   (iv) a tertiary amine compound;
   (v) a hydrophilic carboxylic acid selected from a hydroxyl-carboxylic acid, a hydroxyl-polycarboxylic acid, AGS acid and a combination thereof;
   (vi) a halogenated olefin blowing agent;
   (vii) a stabilizing compound wherein the stabilizing compound comprises an un-alkoxylated polyhydroxy compound having 4 or more hydroxyl groups; and
   (viii) optionally, other additives;
wherein Component (vii) is present in the polyurethane insulation foam composition in an amount less than 10 micro-moles per 100 grams of the polyurethane insulation foam composition.

20. The polyurethane insulation foam composition according to claim 19, wherein the polyurethane insulation foam composition is a two component system.

21. The polyurethane insulation foam composition according to claim 20, wherein Component (vii) comprises erythritol, arabitol, xylitol, sorbitol, mannitol, isomalt, lactitol, maltitol, xylose, glucose, fructose, sucrose, trehalose, lactose, raffinose, cyclodextrin, maltodextrin, corn syrup, amylopectin, or combinations thereof.

* * * * *